United States Patent [19]

Alferness et al.

[11] Patent Number: 5,495,543
[45] Date of Patent: Feb. 27, 1996

[54] POLARIZATION-INDEPENDENT OPTICAL WAVELENGTH SELECTIVE COUPLER

[75] Inventors: Rodney C. Alferness, Holmdel; Fred L. Heismann, Freehold, both of N.J.

[73] Assignee: AT&T Corp., Murray Hill, N.J.

[21] Appl. No.: 372,253

[22] Filed: Jan. 13, 1995

Related U.S. Application Data

[63] Continuation-in-part of Ser. No. 120,119, Sep. 10, 1993.

[51] Int. Cl.$^6$ .................................................. G02B 6/36
[52] U.S. Cl. .......................................................... 385/37
[58] Field of Search ................................ 385/10, 12, 27, 385/31, 37

[56] References Cited

U.S. PATENT DOCUMENTS

| | | | |
|---|---|---|---|
| 4,750,801 | 6/1988 | Alferness | 385/27 |
| 4,966,431 | 10/1990 | Heismann | 385/11 |
| 4,984,863 | 1/1991 | Parriaux et al. | 385/12 |
| 5,022,730 | 6/1991 | Cimini et al. | 385/37 X |
| 5,058,977 | 10/1991 | Sorin | 385/37 X |
| 5,093,876 | 3/1992 | Henry et al. | 385/28 |
| 5,325,392 | 6/1994 | Tohmori et al. | 385/14 |
| 5,337,183 | 8/1994 | Rosenblatt | 385/37 |

OTHER PUBLICATIONS

"Grating–assisted InGaAsP/InP vertical codirectional coupler filter" by R. C. Alferness et al., 6 Nov. 1989, Appl. Phys. Lett. 55(19) pp. 2011–2013.

"Vertically coupled InGaAsP/InP buried rib waveguide filter" by R. C. Alferness, 11 Nov. 1991, Appl. Phys. Lett. 59 (20), pp. 2573–2575.

*Primary Examiner*—Akm E. Ullah

[57] ABSTRACT

A double-periodic grating is described for obtaining polarization-independent filtering and coupling. The grating may be viewed as a combination of two gratings with slightly different grating periods. The two periods are carefully chosen to match the difference in propagation constants of the TE and TM polarization modes such that both modes are coupled at the same wavelength.

A novel method of obtaining a double-periodic grating is described.

6 Claims, 5 Drawing Sheets

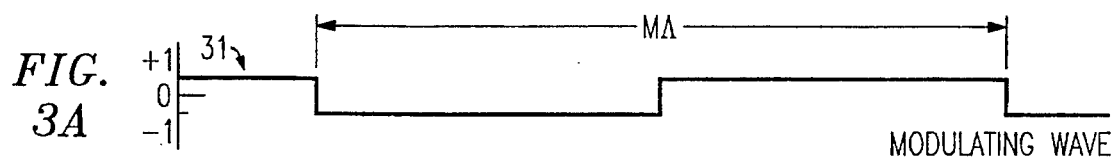
FIG. 3A MODULATING WAVE
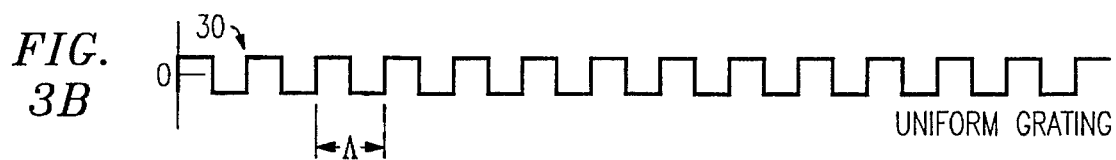
FIG. 3B UNIFORM GRATING
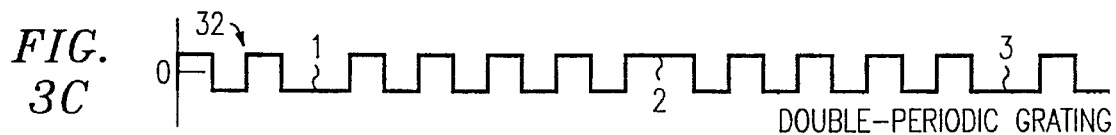
FIG. 3C DOUBLE-PERIODIC GRATING
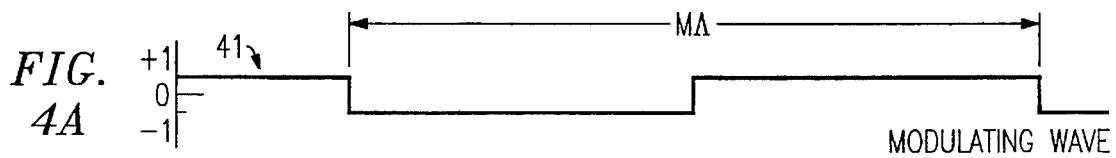
FIG. 4A MODULATING WAVE
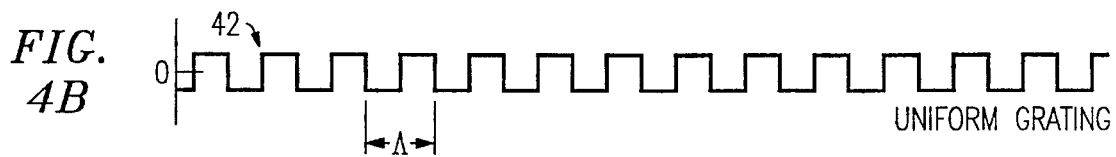
FIG. 4B UNIFORM GRATING
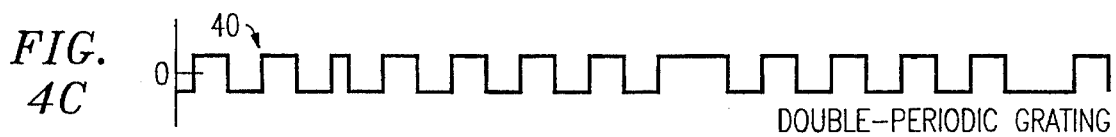
FIG. 4C DOUBLE-PERIODIC GRATING

POLARIZATION-INDEPENDENT OPTICAL WAVELENGTH SELECTIVE COUPLER

This application is a Continuation-in-Part of my earlier filed application Ser. No. 08/120,19, filed Sep. 10, 1993.

TECHNICAL FIELD

This invention relates to grating-assisted optical wavelength selective couplers and filters and, in particular, to such devices that are insensitive to the state of polarization of the incident signal.

BACKGROUND OF THE INVENTION

In order to use wavelength division multiplexing techniques in optical transmission systems, one requires efficient, narrow-band optical wavelength filters. In a paper entitled "Grating-assisted InGaAsP/InP vertical codirectional coupler filter" by R. C. Alferness et al., published in the 6 Nov. 1989 issue of *Applied Physics Letters* 55(19), pp. 2011–2013 there is described a four-part channel-dropping filter employing grated-assisted coupling between asynchronous optical waveguides. However, such devices are polarization dependent and will respond differently for the TE and TM modes. As a consequence, the amplitude of the dropped channel will fluctuate in such devices as the polarization of the input signal varies. Accordingly, it is the object of the present invention to provide optical filters and couplers that operate independently of the state of polarization of the incident light.

SUMMARY OF THE DISCLOSURE

In accordance with the present invention, polarization independent filtering is obtained by means of a double-periodic grating structure which may be viewed as a combination of two gratings with slightly different grating periods. The two periods are carefully chosen to match the difference in propagation constants of the TE and TM modes such that both are coupled at the same wavelength.

It is shown that the double-periodic grating can be realized by multiplying two square wave grating functions, thus simplifying the fabrication of such devices.

The principal of the invention can be applied equally to both two and four-port filters operating either in the transmission or reflection mode.

BRIEF DESCRIPTION OF THE DRAWINGS

FIGS. 3A, 3B, 3C, 4A, 4B and 4C show illustrate how a double-periodic grating is formed by multiplying rectangular gratings of different periodicity;

DETAILED DESCRIPTION

Figure 1:
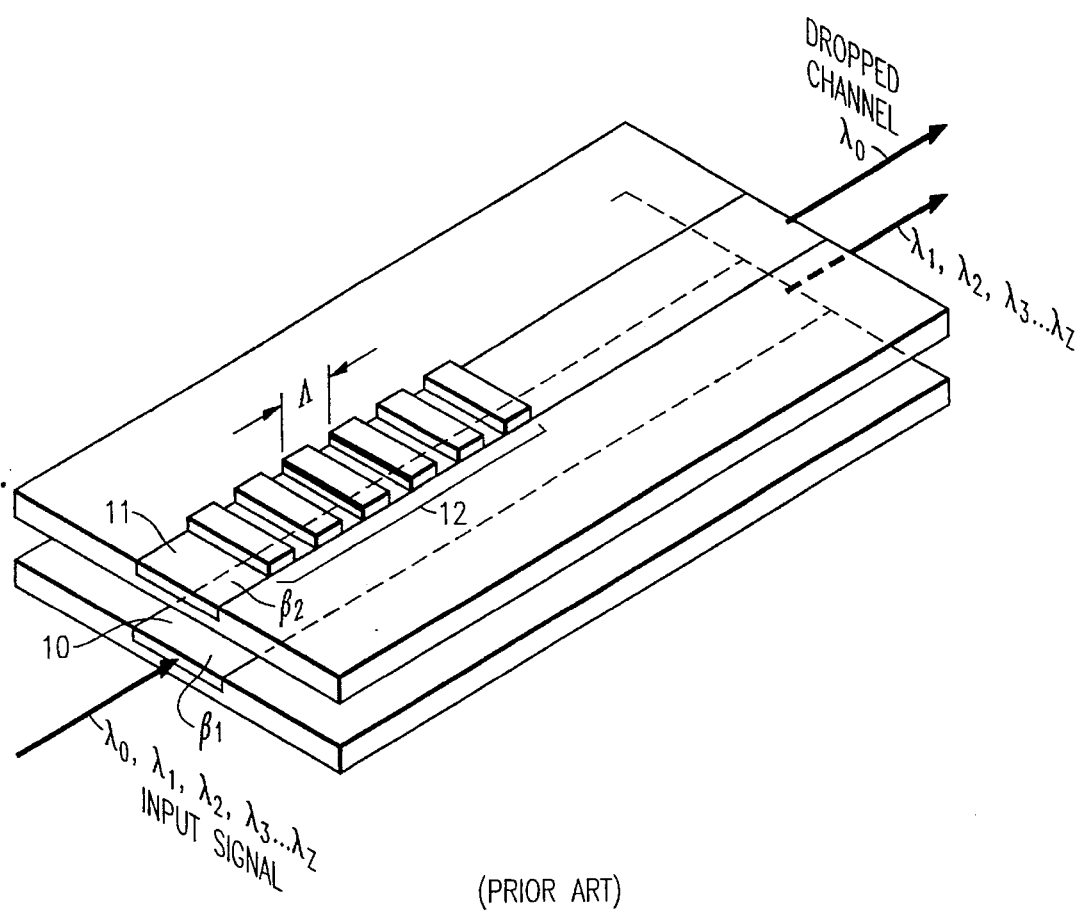
FIG. 1 shows a prior art grating-assisted optical wave coupler.

Referring to the drawing, FIG. 1 shows a prior art grating-assisted, optical coupler comprising two, vertically coupled, optical waveguides 10 and 11. Essentially, the device comprises two, single-mode, asynchronous waveguides (i.e., having greatly different propagation constants, $\beta_2 > \beta_1$) that are efficiently coupled in the forward direction by means of a periodic coupling grating 12. For a more complete description of such devices, see the article by R. C. Alferness et al., entitled "Vertically coupled InGaAsP/InP buried rib wavelength filter", published in the 11 Nov. 1991 issue of *Applied Physics Letter*, 59(20), pp. 2573–2575.

If the grating period $\Lambda$ is chosen such that $$\Lambda = 2\pi/(\beta_2 - \beta_1) \tag{1}$$

there will be a wavelength $\lambda_0$ at which light will be completely coupled between the two waveguides where $$\lambda_0 = (n_2 - n_1)\Lambda \tag{2}$$

and $n_1$ and $n_2$ are the refractive indices of waveguides 10 and 11 respectively. Thus, if signals at wavelengths $\lambda_0, \lambda_1, \lambda_2, \lambda_3 \ldots \lambda_z$ are coupled into the filter, the dropped channel, at wavelength $\lambda_0$, will appear at the output of waveguide 11, whereas the balance of the signals, $\lambda_1, \lambda_2, \lambda_3 \ldots \lambda_z$ will appear at the output end of waveguide 10. The optical bandwidth of the type of wavelength-dependent coupler is inversely proportional to the number of grating periods.

Such grating-assisted directional couplers have previously been demonstrated in InP with optical bandwidths as low as 1.7 nm at wavelengths of 1.5 μm. However, as noted above, these couplers are strongly sensitive to the polarization of the incident light. Typically, coupling for the TE-polarized input light occurs at longer wavelengths than for TM-polarized input light. The difference in wavelength $$\Delta\lambda = \lambda_{0(TE)} - \lambda_{0(TM)} \tag{3}$$

can be as much as 30 nm and, hence, substantially larger than the filter bandwidth. This wavelength shift arises because of the inherent difference in the birefringence for the two waveguides. In particular, the birefringence, $n_{2(TE)} - n_{2(TM)}$, in the higher index guide is usually much higher than the birefringence, $n_{1(TE)} - n_{1(TM)}$, in the lower index guide, where $$n_i = \beta_i \lambda / 2\pi \tag{4}$$

denotes the effective phase indices of the two waveguides, i=1 and 2.

Inasmuch as $$\lambda_{0(TE)} = [n_{2(TE)} - n_{1(TE)}]\Lambda \tag{5}$$

and $$\lambda_{0(TM)} = [n_{2(TM)} - n_{1(TM)}]\Lambda \tag{6}$$

it is apparent that $\lambda_{0(TE)} = \lambda_{0(TM)}$ only if the two waveguides exhibit the same birefringence. In practice, however, it is difficult to fabricate two waveguides that have substantially different propagation constants but equal birefringence. In an alternative solution to this problem, in accordance with the present invention, the equivalent of a double-periodic coupling grating is employed. This grating structure essentially introduces two different coupling periods $\Lambda_{-1}$ and $\Lambda_1$ where $$\Lambda_{-1} < \Lambda < \Lambda_1. \quad (7)$$

For each polarization mode, the filter then exhibits two transmission bands centered at wavelengths $\lambda_{1(TM)}$, $\lambda_{-1(TM)}$, and $\lambda_{1(TE)}$, $\lambda_{-1(TE)}$ respectively, where $$\lambda_{1(TM)} = (n_{2(TM)} - n_{1(TM)})\Lambda_1 \quad (8)$$

$$\lambda_{-1(TM)} = (n_{2(TM)} - n_{1(TM)})\Lambda_{-1} \quad (9)$$

$$\lambda_{1(TE)} = (n_{2(TE)} - n_{1(TE)})\Lambda_1 \quad (10)$$

and $$\lambda_{-1(TE)} = (n_{2(TE)} - n_{1(TE)})\Lambda_{-1}. \quad (11)$$

Figure 2A:
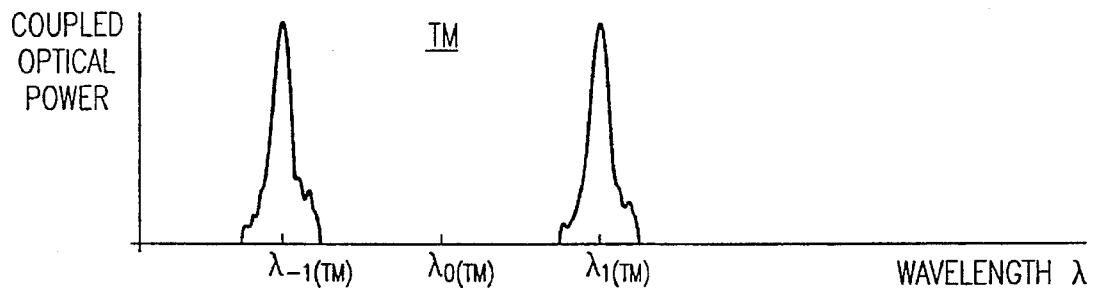
FIGS. 2A and 2B show the optical response of a double-periodic filter.
Figure 2B:
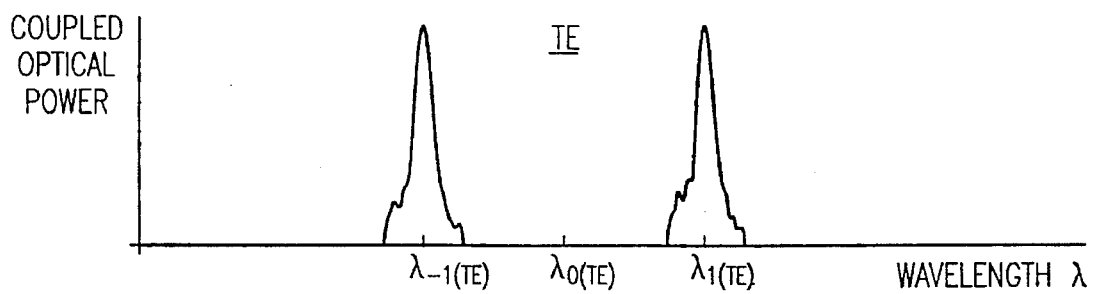
Figure 2C:
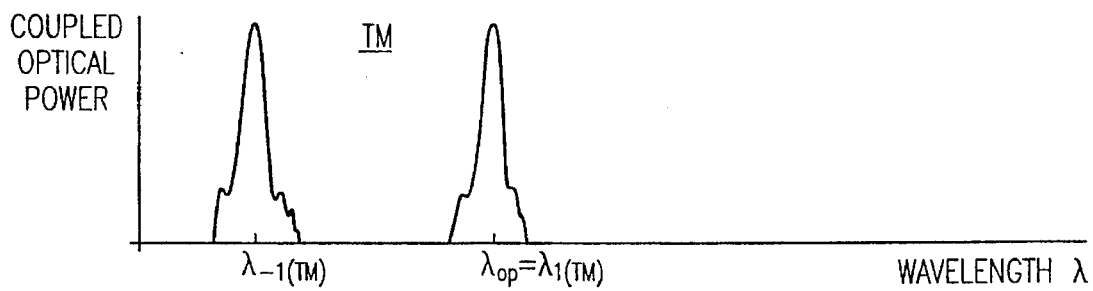
FIGS. 2C and 2D show the optical response of a double-periodic filter wherein the TE and TM modes share a common transmission band.
Figure 2D:
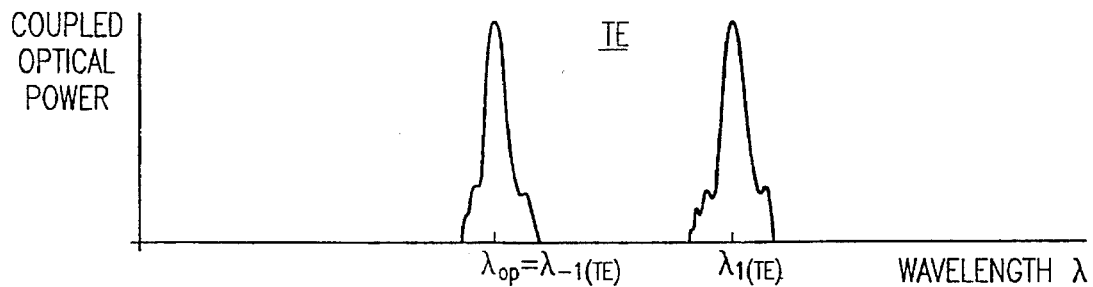

This is illustrated in FIGS. 2A and 2B which shows the optical response of a double-periodic filter for the two modes. In accordance with the invention, the grating is designed so that the two modes share a common transmission band centered at an operating wavelength $\lambda_{op}$. This is illustrated in FIGS. 2C and 2D where $$\lambda_{op} = \lambda_{1(TM)} = \lambda_{-1(TE)} \quad (12)$$

or, from equations (8) and (11), $$\lambda_{op} = \Lambda_1(n_{2(TM)} - n_{1(TM)}) \quad (13)$$

$$\lambda_{op} = \Lambda_{-1}(n_{2(TE)} - n_{1(TE)}). \quad (14)$$

Knowing the refractive indices at the wavelength $\lambda_{op}$, the grating periods $\Lambda_1$ and $\Lambda_{-1}$ can be determined. The useful spectral range, however, is limited to the wavelength span between $\lambda_{1(TE)}$ and $\lambda_{-1(TM)}$ because of the additional transmission bands at those wavelengths which are strongly polarization dependent. Thus, in accordance with the present invention the difference in the birefringence between the two waveguides is advantageously as large as possible.

Having established the conditions for polarization-independent coupling, the remaining problem is how to fabricate a grating having the required double periodicity $\Lambda_1$ and $\Lambda_{-1}$. In accordance with the present invention this can be done in either of two equivalent ways.

From the trigonometric corollary $$2 \sin x \cos y = \sin(x+y) + \sin(x-y) \quad (15)$$

it is seen that the product of two different sinusoids is equivalent to the sum of two different sinusoids. If sin x corresponds to the relatively fine grating $\Lambda$, and cos y corresponds to the relatively course grating of period $M\Lambda$, equation (15) can be rewritten as $$2 \sin K_0 x \cos K_0 x/M = \sin K_{-1} x + \sin K_1 x \quad (16)$$

where $$K_0 = 2\pi/\Lambda \quad (17)$$

$$K_1 = 2\pi/\Lambda - 2\pi/M\Lambda = K_0(1 - 1/M) = 2\pi/\Lambda_1 \quad (18)$$

and $$K_{-1} = 2\pi/\Lambda + 2\pi/M\Lambda = K_0(1 + 1/M) = 2\pi/\Lambda_{-1}. \quad (19)$$

Then, from equations (18) and (19), we obtain $$2/\Lambda = 1/\Lambda_1 + 1/\Lambda_{-1} \quad (20)$$

$$M\Lambda = 2[1/(1/\Lambda_{-1} - 1/\Lambda_1)] \quad (21)$$

where M is any arbitrary number greater than one. Advantageously, M lies between 5 and 10.

Having demonstrated that the product of two gratings, of periods $\Lambda$ and $M\Lambda$, is the equivalent of the sum of two gratings of periods $\Lambda_1$ and $\Lambda_{-1}$, one can construct a filter in either of two ways. One can, for example, multiply two sinusoidally varying gratings of periods $\Lambda$ and $M\Lambda$. This, however, would result in a very complicated grating structure whose elements have height variations that would be relatively difficult to construct. By contrast, a grating structure formed by multiplying a sinusoidal, or square-wave fine grating with a rectangular square-wave coarse grating can be much more easily fabricated. While this gives rise to higher order grating components, these are out of the band of interest and can be ignored. In accordance with this technique, FIGS. 3A, 3B and 3C, now to be considered, show a fine, uniform grating of period $\Lambda$, multiplied by a symmetric square wave function 31 that varies between +1 and −1 and has a period $M\Lambda$.

For purposes of illustration, M was chosen equal to 5, and the amplitude of the modulating wave 31 was selected to switch between +1 and −1, in phase with the fine grating 30. In the intervals +1 and −1, the fine grating is unaffected. The transitions ±1 and ∓1, however, introduce the equivalent of a 180° phase shift in the fine grating. This modifies the fine grating as shown at the transition points 1, 2, and 3 along curve 32 in FIG. 3C. It will be noted that the amplitude of the fine grating is unaffected. Only the distribution of the grating is modified. That is, instead of having a grating element at point 1, the next grating element is displaced a half cycle $\Lambda/2$ relative to the distribution of the grating element along curve 30. The net result, as explained herein above, is to produce the equivalent of a double-periodic grating.

Changes in the displacement of the modulating wave relative to the fine grating produce gratings that are physically different at the transition intervals. This is shown by curve 40 in FIG. 4, which is the result of shifting curve 41 relative to the fine grating 42. However, the response of the filter is the same. Basically, all that is required to produce the desired double-periodic grating is that a half period displacement occurs between intervals of uniform grating.

Figure 5:
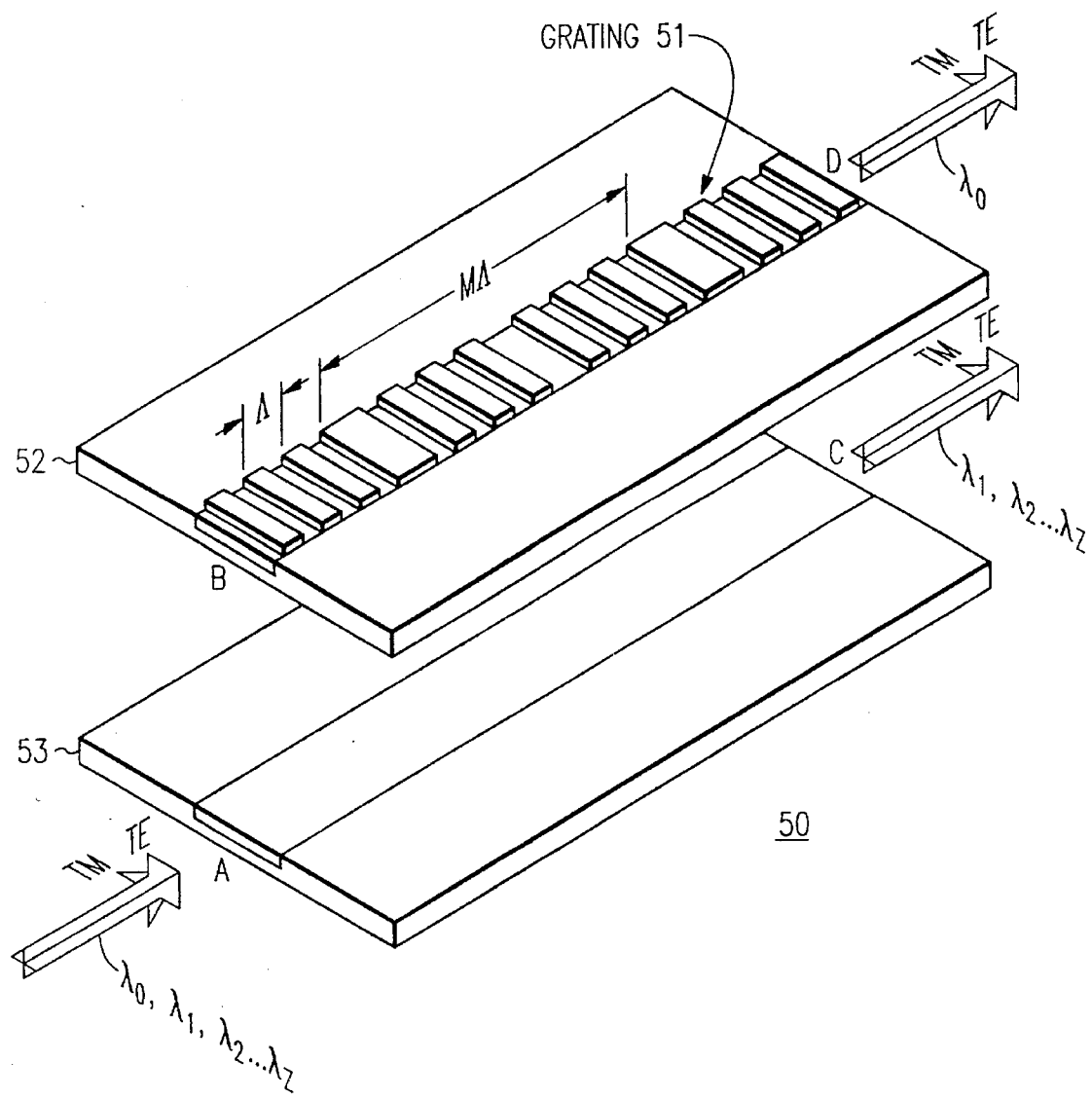
FIG. 5 shows a four-port filter in accordance with the teachings of the invention.

FIG. 5 shows a four-port, vertically-stacked, forward-coupling filter 50 incorporating a double-periodic grating 51 in accordance with the present invention. Incident light waves, at wavelengths $\lambda_0, \lambda_1, \lambda_2 \ldots \lambda_z$, enter the lower left port A of the filter in both the TE and TM modes. The dropped channel, at wavelength $\lambda_0$, leaves the filter by way of the upper right port D of upper waveguide 52. Being polarization independent, both modes are preserved and exit together. The remaining signals $\lambda_1, \lambda_2 \ldots \lambda_z$ continue along the lower waveguide 53 and exit via port C.

Figure 7:
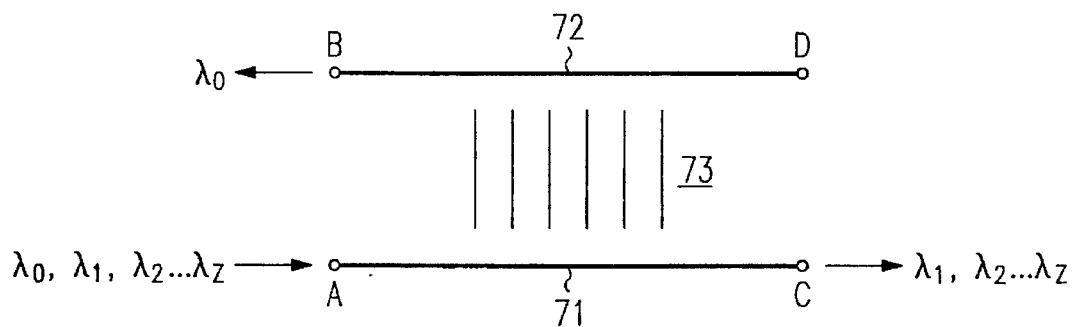
Figure 8:
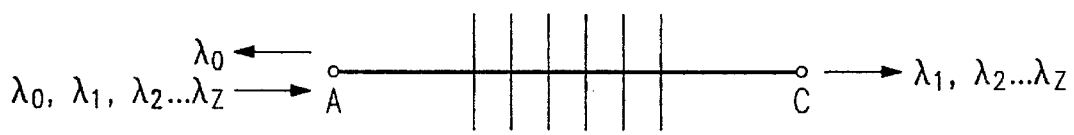

The illustrative embodiment shown in FIG. 5 is, as noted, a forward-coupled, four-port filter. However, the double-periodic grating is not limited to such devices. The invention can, just as readily, be incorporated into reverse-coupled, four-port filters, and reverse-coupled, two-port filters. These are illustrated in FIGS. 6, 7 and 8, which show, symbolically, a forward-coupled four-port filter, a reverse-coupled four-port filter, and a reverse-coupled two-port filter.

Figure 6:
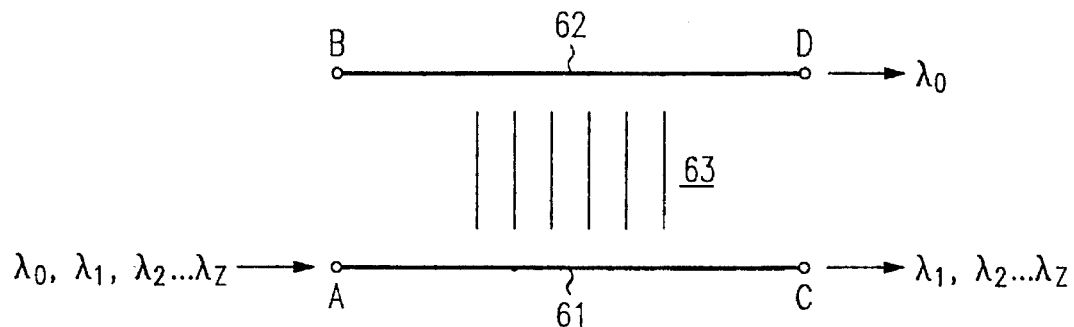
FIGS. 6, 7 and 8 show alternate embodiments of the invention.

Referring to FIG. 6, the two lines 61 and 62 represent the two wavelengths, and the vertical lines 63 between the wavepaths represent the grating. The input signal is applied to port A. The dropped channel appears at port D, and the remaining channels exit at port C.

For this filter, the relation between the transmission bands for each of the modes, and the grating periods were given by equations (8), (9), (10) and (11). To design a reverse-coupled, four-port filter, as represented in FIG. 7, $n_1$ in the several equations is replaced by $-n_1$ and the equations become $$\lambda_{1(TM)}=(n_{2(TM)}+n_{1(TM)})\Lambda_1 \quad (22)$$

$$\lambda_{-1(TM)}=(n_{2(TM)}+n_{1(TM)})\Lambda_{-1} \quad (23)$$

$$\lambda_{1(TE)}=(n_{2(TE)}+n_{1(TE)})\Lambda_1 \quad (24)$$

and $$\lambda_{-1(TE)}=(n_{2(TE)}+n_{1(TE)})\Lambda_{-1}. \quad (25)$$

In a grating design based upon these equations, a signal applied to port A of waveguide 71 will divide between port C and port B of waveguide 72.

In the two-port case, illustrated in FIG. 8, there is only one waveguide. Hence, $n_2=n_1$. In the forward-coupled case, where $n_1$ is positive, all the equations reduce to zero, indicating that a forward-coupled, two-port filter cannot be realized. In the case of a reverse-coupled, two-port filter, the equations become $$\lambda_{1(TM)}=2n_{(TM)}\Lambda_1 \quad (26)$$

$$\lambda_{-1(TM)}=2n_{(TM)}\Lambda_{-1} \quad (27)$$

$$\lambda_{1(TE)}=2n_{(TE)}\Lambda_1 \quad (28)$$

$$\lambda_{-1(TE)}=2n_{(TE)}\Lambda_{-1}. \quad (29)$$

While reference was made to a vertically-stacked filter, the invention is not limited to this particular configuration. In general, the two waveguides can be arranged along side each other, or in any other convenient configuration.

What is claimed is:

1. A polarization-independent four-port coupler comprising:

a pair of asynchronous optical waveguides in coupling proximity and a coupling grating distributed along one of said waveguides wherein:

said grating has a double periodicity $\Lambda_1$ and $\Lambda_{-1}$ such that at an operating wavelength $\lambda_{op}$ $$\lambda_{op}=\Lambda_1(n_{2(TM)}-n_{1(TM)})$$

and $$\lambda_{op}=\Lambda_{-1}(n_{2(TE)}-n_{1(TE)});$$

where:

$n_{2(TE)}$ and $n_{2(TM)}$ are the refractive indices at wavelength $\lambda_{op}$ of one of said waveguides to the TE and TM modes respectively; and $n_{1(TE)}$ and $n_{1(TM)}$ are the refractive indices at wavelength $\lambda_{op}$ of the other of said waveguides to the TE and TM modes respectively.

2. A polarization-independent coupler as in claim 1 wherein said grating comprises:

a plurality of grating sections, each having a uniform periodicity $\Lambda$, separated by phase shifts $\Lambda/2$, where $2/\Lambda=1/\Lambda_1+1/\Lambda_{-1}$, and wherein:

said phase shifts occur at intervals equal to $M\Lambda/2$ where $$M\Lambda=2/(1/\Lambda_{-1}-1/\Lambda_1)$$

and M is any number greater than one.

3. A polarization-independent four-port coupler comprising:

a pair of asynchronous optical waveguides in coupling proximity; and a reflective grating distributed along one of said waveguides; wherein:

said grating has a double periodicity $\Lambda_1$ and $\Lambda_{-1}$ such that at an operating wavelength $\lambda_{op}$ $$\lambda_{op}=\Lambda_1(n_{2(TM)}+n_{1(TM)})$$

and $$\lambda_{op}=\Lambda_{-1}(n_{2(TE)}+n_{1(TE)});$$

where:

$n_{2(TE)}$ and $n_{2(TM)}$ are the refractive indices at wavelength $\lambda_{op}$ of one of said waveguides to the TE and TM modes respectively; and $n_{1(TE)}$ and $n_{1(TM)}$ are the refractive indices at wavelength $\lambda_{op}$ of the other of said waveguides to the TE and TM modes respectively.

4. A polarization-independent coupler as in claim 3 wherein said grating comprises:

a plurality of grating sections, each having a uniform periodicity $\Lambda$, separated by phase shifts $\Lambda/2$, where $2/\Lambda=1/\Lambda_1+1/\Lambda_{-1}$, and wherein:

said phase shifts occur at intervals equal to $M\Lambda/2$ where $$M/\Lambda=2/(1/\Lambda_{-1}-1/\Lambda_1)$$

and M is any number greater than one.

5. A polarization-independent two-port filter comprising:

an optical waveguide in guiding proximity; and a grating distributed along said waveguide, wherein:

said grating has a double periodicity $\Lambda_1$ and $\Lambda_{-1}$ such that at an operating wavelength $\lambda_{op}$ $$\lambda_{op}=\Lambda_1 2n_{(TM)}$$

and $$\lambda_{op}=\Lambda_{-1} 2n_{(TE)}$$

where:

$n_{(TE)}$ and $n_{(TM)}$ are the refractive indices at wavelength $\lambda_{op}$ of said waveguide to the TE and TM modes respectively.

6. A polarization-independent coupler as in claim 5 wherein said grating comprises:

a plurality of grating sections, each having a uniform periodicity $\Lambda$, separated by phase shifts $\Lambda/2$, where $2/\Lambda=1/\Lambda_1+1/\Lambda_{-1}$, and wherein:

said phase shifts occur at intervals equal to $M\Lambda/2$ where $$M\Lambda=2/(1/\Lambda_{-1}-1/\Lambda_1).$$

and M is any number greater than one.

\* \* \* \* \*